US007166211B1

(12) United States Patent
Boyd

(10) Patent No.: US 7,166,211 B1
(45) Date of Patent: Jan. 23, 2007

(54) PROCESS AND APPARATUS FOR MICROBIAL FILTRATION AND BACTERIAL INJECTION FOR ONE OR MORE ENVIRONMENTAL CONTAMINANTS

(75) Inventor: Steven H. Boyd, Falmouth, MA (US)

(73) Assignee: Hydros, Inc., Falmouth, MA (US)

( * ) Notice: Subject to any disclaimer, the term of this patent is extended or adjusted under 35 U.S.C. 154(b) by 0 days.

(21) Appl. No.: 10/833,409

(22) Filed: Apr. 28, 2004

Related U.S. Application Data

(60) Provisional application No. 60/467,166, filed on May 1, 2003.

(51) Int. Cl.
*C02F 3/00* (2006.01)

(52) U.S. Cl. .................... 210/150; 210/151; 210/532.2

(58) Field of Classification Search ................ 210/150, 210/151, 615–617, 532.2
See application file for complete search history.

(56) References Cited

U.S. PATENT DOCUMENTS 4,066,722 A * 1/1978 Pietruszewski et al. ....... 261/87
4,924,564 A * 5/1990 Shah .......................... 126/512
5,131,321 A * 7/1992 Brummelhuis ............... 99/471

(Continued)

OTHER PUBLICATIONS

The International Search Report dated Oct. 25, 2005.

*Primary Examiner*—Chester T. Barry
(74) *Attorney, Agent, or Firm*—Nields & Lemack

(57) ABSTRACT

Scaleable bacterial injection, aeration and filtration system to effectively control microbial community function of aquatic systems. The present invention is a substantially simplified system with respect to handling growth and dispersion of microorganisms in solution and is also adaptable to many different end-use applications, including treatment of ornamental fish and aquaculture, pond and streams and sewage treatment systems. Initial microorganism materials are provided in the form of aqueous suspensions, which are incorporated into a large volume of water in a vessel. Microorganisms are entrapped inside a carrier that serves as a physical enclosure for cell retention. It has a porous structure to facilitate the diffusion of substances, such as ammonia, nitrate, nutrients, fuels and organic carbon, into its internal void volume, where substrate reduction is accomplished by entrapped cells. Specific species of microbes are injected into a filtration matrix that is bathed in oxygenated effluent and a portion of which is dispensed into an aqueous environment. The apparatus can be electronic, air or fluid driven and injected with the desired microbial species, preferably multiple time per day. Multi-stage media can be placed into packed filter units of convenient sizes for wastewater regeneration as well as natural water pollution reduction. The reactor canisters containing entrapped cells are portable and can be assembled off-site and then delivered to the field for installation and immediate operation. Bio-solid reduction, odor reduction, unplugging of leaching fields, conversion and reduction of nitrogen species in natural waters such as lakes and ponds, etc. can be accomplished.

17 Claims, 10 Drawing Sheets

ABIF SHOWING CONTROLLER BOX AND UNDER WATER UNIT WITH FEED LINES.

U.S. PATENT DOCUMENTS

Figure 1:
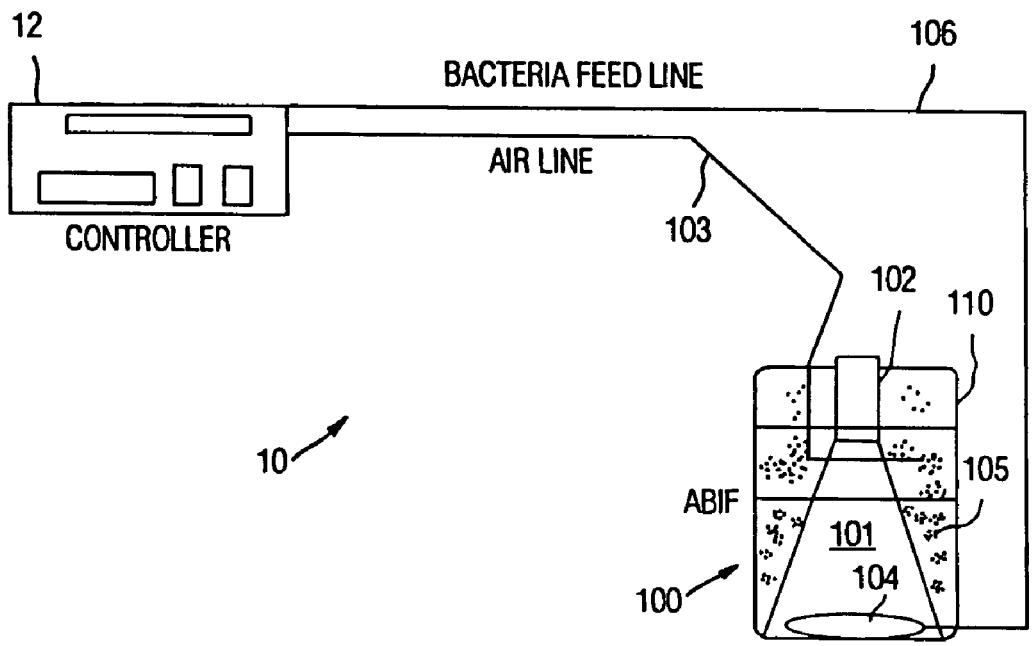

| | | | |
|---|---|---|---|
| 5,217,616 A * | 6/1993 | Sanyal et al. | 210/617 |
| 5,223,130 A * | 6/1993 | Valfrido | 210/170 |
| 5,227,067 A | 7/1993 | Runyon | 210/606 |
| 5,227,068 A | 7/1993 | Runyon | 210/610 |
| 5,266,200 A * | 11/1993 | Reid | 210/605 |
| 5,314,619 A | 5/1994 | Runyon | 210/606 |
| 5,441,634 A * | 8/1995 | Edwards | 210/194 |
| 5,585,266 A * | 12/1996 | Plitt et al. | 435/395 |
| 5,788,841 A * | 8/1998 | Dickerson | 210/610 |
| 5,980,738 A * | 11/1999 | Heitkamp et al. | 210/150 |
| 6,428,701 B1 * | 8/2002 | Mullennix et al. | 210/606 |
| 6,461,511 B1 | 10/2002 | Baba et al. | |
| 6,905,603 B2 * | 6/2005 | Mirzayi et al. | 210/615 |
| 2001/0027948 A1 * | 10/2001 | Tipton et al. | 210/629 |
| 2002/0134717 A1 * | 9/2002 | Jowett | 210/150 |

\* cited by examiner

ABIF SHOWING CONTROLLER BOX AND UNDER WATER UNIT WITH FEED LINES.

ABIF IN A NON COMMERCIAL LEACHING PIT CONNECTED TO A SEPTIC TANK.

MULTIPLE ABIF ARRAYS SHOWING CONTROLLERS ON SHORE OR ON THE FLOATING ABIF UNIT.

ILLUSTRATES THE SYSTEM OF THE PRESENT INVENTION POSITIONED IN A SEPTIC TANK.

CHART OF EXPERIMENTAL AND CONTROL TESTS AMMONIA LEVELS IN 25 GALLON AQUARIUM.

DIAGRAMMATIC VIEW OF THE VESSEL OF FIG. 1 SHOWN IN A FISH AQUACULTURE POND.

CHART OF NITROGEN VERSUS AMMONIA LEVELS.

ABIF SYSTEM POSITION IN A 2000 GALLON SEPTIC TANK. CONTROLLER IS BURIED AT GROUND LEVEL.

FLUID LEVEL IN A SEPTIC PIT.

PROCESS AND APPARATUS FOR MICROBIAL FILTRATION AND BACTERIAL INJECTION FOR ONE OR MORE ENVIRONMENTAL CONTAMINANTS

This application claims priority of provisional application Ser. No. 60/467,166, filed May 1, 2003, the disclosure of which is hereby incorporated by reference.

FIELD OF INVENTION

The present invention relates to a wastewater treatment injection and aeration system that utilizes a multilayered microbial attachment medium for bio-filtration and multiple loci attached for bacterial attachment and growth. The attachment medium may be synthetic or natural and be made of a membrane, filter, porous layers or granular pellets. In addition, the present invention relates to bacterial augmentation and dispensing for treating water-containing pollutants. More particularly, the present invention relates to aqueous systems, including biological media, used to aerobically and anaerobically treat aerobic and anaerobic liquid waste in the water. Still more particularly, the present invention relates to treatment of systems from both large and small-scale aqueous systems. The present invention includes apparatus and methods for directing the treatment process in a way that minimizes scale of the treatment system.

A process and system for enhanced nutrient removal in contaminated aqueous wastewater is disclosed. Fluids are drawn through an Applied Bacterial Injection Filter (ABIF), an underwater unit used to form an overall aerobic zone in order to enhance distribution of the injected microbes into the contaminated water. A portion of the influent is preferably recycled back to an anaerobic zone of the underwater unit to enhance filtration of solids and to redistribute aerobic species into the contaminated water.

BACKGROUND OF INVENTION

Improvement of water quality to enhance environmental stability is a subject of significant interest, and several previous patents have issued that deal to some extent with the various issues involved. For example, U.S. Pat. Nos. 5,227,067; 5,227,068; and 5,314,619, all in the name of L. Runyon, and assigned to Eco Soil Systems, Inc. of San Diego, Calif., address a variety of aspects of soil remediation and enhancement, and water treatment by applying various microorganisms, enzymes and nutrients for the microorganisms in water. The systems described in these patents have proved to be successful, and substantial benefits have been obtained for such application areas as golf courses, parks and field crops. However, these previous systems utilized solid reactants which had that have to be dissolved or dispersed prior to use, or were cumbersome and not particularly suited for prolonged water treatment, or could not be used in a wide variety of different types of applications. In particular, the handling of the solid reactants often posed problems with respect to different dissolution rates, concentrations and growth rates.

Several other prior water treatment systems, not based on wetland entrainment have also been described. These systems have been designed for large- and/or small-scale treatment using biological media, containment in the form of tanks, and various types of recirculation to accelerate contaminant reduction. For the most part, they include biological treatment as well as mechanisms designed to enhance the effectiveness of the microbial action. Unfortunately, each suffers from one or more deficiencies that significantly affect the ability to provide the most effective and relatively inexpensive water treatment systems.

For example, ammonia build-up in aquaculture ponds (locals used for growing aquatic animals for food or ornamental viewing pleasure) is problematic, since as little as 3 parts per million (mg/L) is sufficient to poison fish. However, the presence of ammonia is inevitable, as it is a by-product of fish waste. Bacteria typically used to nitrify the ammonia also lower the oxygen level of the system, which can be deleterious to the animals therein.

Similarly, fat, oil and/or grease build-up in septic systems is a pervasive problem, particularly where the septic systems are handling large volumes of waste, such as those associated with restaurants. Typically, these septic systems have little or no capacity to handle fat, oil and grease. As a result, these compounds proceed through the septic system and into the leaching field un-degraded, and eventually clog the leaching field, resulting in the failure of the entire system.

The accumulation of nutrients in aquaculture ponds, the leaching of nutrients from failed septic systems, and other wastewater treatment cites present a defined need to apply bacterial remediation to help restore the systems to their natural levels. However; dosing and distribution of bacteria in aqueous environments has been problematic.

SUMMARY OF THE INVENTION

The invention herein provides a broadly scaleable convenient bacterial injection, aeration and filtration system to effectively control microbial community function of aquatic systems. The present invention is a substantially simplified system with respect to handling growth and dispersion of microorganisms in solution and is also adaptable to many different end-use applications, including treatment of ornamental fish and aquaculture, ponds and streams and sewage treatment systems. A key provision is the initial microorganism materials in the form of aqueous suspensions, which are incorporated into a large volume of water in a vessel. Subsequent growth of biomass in the vessel provides for simplicity and flexibility not previously obtained from the prior art devices and methods. Specifically, the present invention is based on entrapping microorganisms inside a carrier that serves as a physical enclosure for cell retention. It has a porous structure to facilitate the diffusion of substances, such as ammonia, nitrate, nutrients, fuels and organic carbon, into its internal void volume, where substrate reduction is accomplished by entrapped cells. More specifically, the present invention relates to a process and apparatus for the injection of specific species of microbes into a filtration matrix that is bathed in oxygenated effluent and a portion of which is dispensed into an aqueous environment. The apparatus can be electronic, air or fluid driven and injected with the desired microbial species, preferably multiple times per day. Multi-stage media can be placed into packed filter units of convenient sizes for wastewater regeneration as well as natural water pollution reduction. Reactor canisters containing entrapped cells are portable and can be assembled off-site and then delivered to the field for installation and immediate operation. Bio-solid reduction, odor reduction, unplugging of leaching fields, conversion and reduction of nitrogen species in natural waters such as lakes and ponds, etc. can be accomplished.

In one embodiment, the present invention is a method for remediation and enhancement of water that comprises injecting concentrated aqueous suspensions of microorganisms and/or nutrients into a multilayer matrix in a vessel.

Filtration and mixing of the microorganisms takes place in the vessel to an extent sufficient for the microorganisms to feed on at least a portion of the nutrients present in the system, reproduce and multiply into a concentrated biomass containing a remainder of the nutrients and an increased number of the microorganisms in the water. Simultaneously or thereafter, at least a portion of the biomass is dispensed, completely or continuously, from the vessel and dispersed to aqueous habitats.

In yet another embodiment, the invention is apparatus for remediation and enhancement of aqueous environments which comprises: at least one controller, a container for a concentrated aqueous suspension of microorganisms and/or nutrients, a timing mechanism for timing the distribution of the suspension, one or more associated pumps and an air or water delivery system with a liquid or air conduit for moving the suspension through the conduit and introducing the suspension into a multi-layer solid within a vessel. Conditions within the vessel are produced and maintained over a period of time that are conducive to reproduction and growth of the microorganisms in the presence of the nutrients, such that the microorganisms, during the period of time, multiply into an aqueous biomass comprising the microorganisms dispersed in vessel water. The apparatus further includes dispensing means for removing aqueous biomass from the vessel; such that the aqueous biomass can subsequently be dispersed into soil or water, for example, and the microorganisms therein maintained alive and active for a period of time sufficient to enhance predetermined desirable properties of the soil or water or reduce predetermined undesirable properties of the soil or water.

In a preferred embodiment, the ABIF underwater unit is placed near the outlet of a septic tank. The septic system is provided with an ABIF unit, which consists of a surface controller having at least one bacterial containing reservoir(s), air pump(s), fluid pump(s), and tubing for air and liquids(s). Water flows from the controller toward an underwater outlet with means for distributing air into the water at least partially filling the underwater container, and means for adding bacteria to the underwater container. The underwater container includes means for filtering water.

In another preferred embodiment, an ABIF treatment system is provided comprising a plurality of controller units and subsurface units each having different species of bacteria and/or different flow rates and/or aeration rates.

In another embodiment, an ABIF treatment unit is scaled down to fit into an aquarium containing fishes and invertebrates. The controller unit is located outside the aquarium and is powered by a suitable power soured such as electricity from batteries or direct power. The species of bacteria being fed into the system are utilized to reduce ammonia and nitrate waste products.

In an additional embodiment of the invention, a process is provided for improved nitrogen conversion and/or removal from wastewater treated in a wastewater system. The process includes placing an ABIF unit in the effluent end of a system. This location is primarily where settled wastewater is aerated, filtered and bacteria is augmented.

In yet another embodiment, the system is driven with fluid pumps that drive the fluids across membranes and out the central containment area.

Various other features, objects and advantages of the present invention will be made apparent from the following detailed description and the drawings.

BRIEF DESCRIPTION OF THE DRAWINGS

FIG. 1 is a schematic diagram of the apparatus in accordance with the present invention, including an underwater vessel, air and bacterial feed lines and control systems for delivering bacteria and air;

FIG. 2 is a cross-sectional view of a vessel for use in accordance with the present invention;

FIG. 2A is a cross-sectional view of a vessel cover for use in accordance with the present invention;

FIG. 3 is a diagrammatic view of the vessel of FIG. 2 shown in a septic leaching pit;

FIG. 4A is a schematic view of the use of multiple systems to inject separate bacterial assemblages in accordance with the present invention;

FIG. 4B is schematic view of the use of a single controller in accordance with the present invention;

FIG. 5 is a schematic view of a vessel controlled by a single controller positioned in a septic tank in accordance with the present invention;

FIG. 6 illustrates the system of the present invention positioned in a stream under a pier;

FIG. 7 is a graph of leaching pit fluid level decrease in a 90-day treatment cycle;

FIG. 8 illustrates a vessel of FIG. 2 shown in an aquarium;

FIG. 9 is a chart of experimental and control ammonia levels in a 25-gallon aquarium;

FIG. 10 illustrates the system of the present invention moored in a fish aquaculture pond;

FIG. 11 is a chart of ammonia data from a 2 hectar eel pond;

FIG. 12 shows a top view of a septic tank with the system of the present invention installed;

FIG. 13 is a schematic diagram of the system of FIG. 12;

FIG. 14 is a graph of leaching field effluent; and

FIG. 15 is graph of pump run times versus time for RUCK filters.

DETAILED DESCRIPTION AND PREFERRED EMBODIMENTS

The discussion concerning this invention will be best understood by reference to the figures.

In FIG. 1, the basic schematic is shown at 10. The device has at least two basic units that can be combined, but are generally separated with one unit submerged below the water and the second above. The Controller Unit (CU) 12 can be contained in a single enclosure or separated into individual enclosures for each component. The CU 12 includes as a minimum one or more air delivery pump(s), timer controllers, liquid distribution pumps and one or more bacterial cartridges. The bacterial cartridges can be populated with the same or different species of bacteria, depending upon the application as discussed in greater detail below.

A second basic unit of the system 10 is the underwater unit 100. Air, oxygen, other gases (e.g., argon, nitrogen, etc. such as to drive oxygen off) or fluid and bacteria are delivered to the underwater unit 100 by any suitable means, such as plastic tubing or any suitable tubes or conduits in fluid communication with a respective air (or oxygen) source and bacteria source, as controlled by the Controller Unit 12. The unit is scalable, and preferably is at least 1 foot in diameter, more preferably in the range of about 3 to 15 feet in diameter.

With reference to both FIGS. 1 and 2, the underwater unit 100 preferably includes 5 basic sections: (1) an accelerator, preferably an air flow cone 101 and chimney 102 housed in containment vessel 110; (2) an air or gas injection line 103 in communication with an diffuser 104; (3) filtration matrixes in the vessel 110; (4) bacterial injection line 106; and (5) a cover 109 and the outer containment vessel 110. The base of the cone 101 includes one or more apertures 108 for the inflow of water. A cover 109 for the vessel 110 (FIG. 2A) preferably also is provided, the cover having a central aperture 111 to accommodate the chimney 102 of the accelerator, and a plurality of apertures 108' for the flow of water into the vessel 110. The apertures 108', as well as apertures provided on the cover, allow fluid to flow over the media and then through the cone base and finally into the environment via the orifice 102. This allows for the recycling of water and/or bacteria back through the filtration matrix and vessel. The accelerator 101 can be constructed of any suitable material that can withstand the aqueous environment in which it is used and that is not deleterious to the operation of the system, such as plastics including polyolefins, particularly polypropylene and polyethylene. The cone shape, which is preferred but not required, assists in enhancing and accelerating flow through the structure and out the chimney 102 that extends from the cone 101 out the vessel 110. More particularly, air or oxygen is preferably introduced at the bottom of the cone 101 by one or more diffusers 104 in fluid communication with a suitable source of air or oxygen (such as ambient atmosphere) via line 103. The air diffuser(s) 104 have a bubble output side that provide bubbles of air or oxygen evenly across the diameter inlet opening of the cone. As the air or oxygen exits the diffuser(s) 104, it causes the water to flow upwardly (towards the water surface) and accelerate as its reaches the chimney 102 and exits the device into the aqueous system. The flow rate of air or oxygen used is not particularly limited, and depends in part on the specifications of the pump used. One suitable flow rate of air or oxygen is 140 liters per hour. Suitable diffusers are commercially available.

The underwater unit 100 in FIG. 1 also includes a filtration matrix 105 (FIG. 3), preferably a multi-layer membrane, housed in the vessel 110 about the accelerator 101. Preferably the media is positioned between the cone and the inner BAM walls. Suitable membranes include mechanical filters that are commercially available from Bio Cord, Bio-Chem Stars, Siporax, Bio Barrels, Bio-Fill, Matala filtration media. All are available through multiple vendors such as Aquatic Eco-Systems Inc. and Apoka Fl. One suitable filtration matrix is comprised of rock wool, and can be hydrophilic or hydrophobic depending upon the nature of the bacteria involved in the system. Where multiple membranes are used, each membrane can be chosen to be a suitable substrate for one or more particular species of bacteria, the same or different from that of a neighboring membrane. The appropriate selection of the membranes corresponds to the identity of the bacteria required for the particular remediation desired, and is within the skill in the art. For example, a top layer of a relatively open layer of clay balls, followed by an intermediate middle layer of spun rock, followed by a relatively closed lower layer of plastic fiber, can comprise one suitable filtration matrix. The matrix acts as a solid support and holds and maintains solid phase adherent bacteria that are introduced via bacteria line 106 in communication with a suitable bacteria source, such as one or more bacteria cassettes (not shown) associated with the Controller Unit 12. The matrix is chosen to be suitable to allow one or more bacteria species to populate, thereby building an effective biomass or bacterial community on the matrix suitable for biofiltration. Preferably the filtration matrix is removable so that it can be replaced if and when it becomes exhausted.

Figure 7:
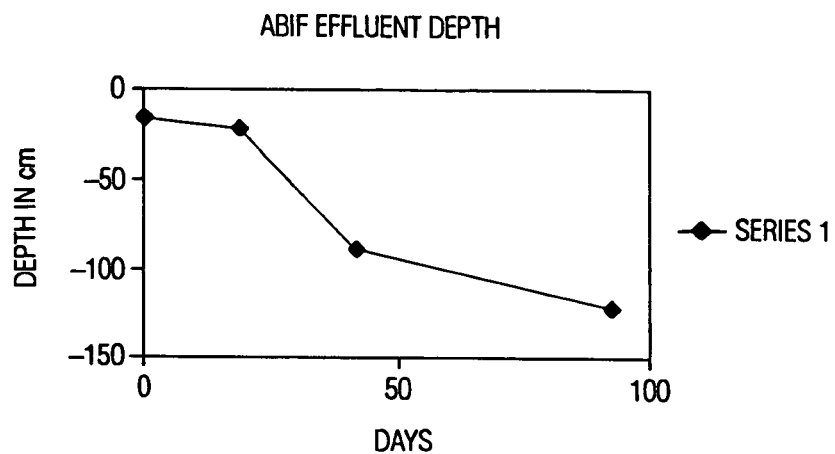

Thus, the specie or species of solid phase adherent bacteria that are added to the matrix 105 to populate the same are chosen based upon the nutrients present in the aqueous system being treated. For example, if petroleums, pesticides, dioxins or other wastes are present in the aqueous system, bacteria that target these contaminants (either naturally or through genetic engineering) are provided. More than one species can be provided. Since the system is typically in a constant state of flux, wherein bacteria are continuously adhering to the matrix while other bacteria are dying or are leaching off of the matrix, the solid phase adherent bacteria are continuously, or more preferably continually added to the system. The rate and timing of the addition is controlled by Controller Unit 12, and is determined by one skilled in the art based upon the dynamics of the aqueous system being treated. For example, 100–200 ml per day of bacterial suspension has been found to be suitable for one particular application. In this case a 800 gallon leaching pit serving a 4 bedroom home had begun flooding the surface and creating odor. The ABIF was started with air pumped at 140 L per hour and bacterial feed rates of 200 ml per day. Odor and fluid height measurements were made on monthly intervals and the data for fluid level change is shown in FIG. 7.

In addition to solid phase adherent bacteria that populate the matrix 105, the present invention also is capable of augmenting free bacteria in the aqueous system being treated. This feature has application in, for example, aquacultural systems for the nitrification of ammonia. Accordingly, bacteria suitable for converting ammonia to nitrate are introduced into the vessel 110 by the Controller Unit 12. These bacteria flow through the matrix 105 and do not adhere thereto, and exit through chimney 102 into the aqueous environment to feed on ammonia present in that environment. Preferably this augmentation is semi-continuous; for example, such bacteria can be introduced into the system in amounts of 25 ml, four times per day. Those skilled in the art will appreciate that the nature, amount and flow rate of bacteria depends upon the concentration of ammonia present in the environment being treated, and can be determined on a case-by-case basis by one skilled in the art.

Thus, the process begins with pre-grown and stabilized bacteria cultures that are introduced, such as by pumping, into the solid support filtration media 105. Air or oxygen or fluid is distributed into the cone region preferably through a fine bubble dispenser 104, and rapidly rises, causing water to be drawn into the system through vent ports or apertures 108 in the top and sides of the vessel 110 and 108' in the vessel cover across the membrane media. The bacteria that do not adhere to the matrix, or those that break off there from, are dispensed over the media and are drawn into the cone 101 and out the chimney region 102 to be dispersed into the surrounding environment. Concurrently, suspended debris and partials are being filtered through the removable media layers in the vessel, with the nutrients therein being consumed by the bacteria populating the matrix. Those skilled in the art are able to determine the sampling methods and materials appropriate for their needs by selecting those parameters that provide the desired functional response. For example, the bacterial addition rates are based on several parameters, including but not limited to: effluent flow rate, type of effluent, oxygen concentration, biological oxygen demand, depth of fluid, volume of fluid, and type of remediation desired. Specifically, for an ABIF to be used in Fat, Oil and Greases (FOG) grease trap mode, the ABIF airflow is set based on the percent grease, volume of tank, depth of fluid and the nature of the grease present. For example, with an 800–1000 gallon grease trap, the diffuser used was 1–2 mm aperture, the air was forced at 120 L/min air with a 4 cm inflow opening on the ABIF cover unit. Unit depth was placed in the midpoint of the tank. Bacterial species are optimized for FOG break down and fed at a rate of 125 ml per day using a standard controller assembly. Bacteria were grown in Bacto Peptone or Bitek Tryptone as generally described in the Manual of Microbiological Culture Media, Beckton Dickinson And Company, Sparks, Md., USA, and stored in a cassette.

An important aspect of the present invention is drawing ambient liquid through the layered filter media where concentrated liquid solutions of microorganisms and associated enzymes and nutrients are present. Ambient liquid can be recycled one or more times through the system; for example, a 1000-gallon tank can filter over 3000-gallons per day. The use of liquid microorganism feed such as from cassettes substantially enhances the present process with respect to the prior art, which utilizes no initial bacterial feeds or utilizes solid initial reactants, which had to be incorporated directly into the biomass growth reactors. The cassettes are modified versions of cassettes that are commercially available, such as Cubitainer cassettes that are plastic containers in a cardboard enclosure. The modifications include reinforcing the outside walls, and venting the plastic container to prevent container collapse and spilling. Use of liquid bacteria and micronutrients through separate feed cassettes allows the growth to proceed much more rapidly at the start and with much greater uniformity and predictability, since the liquid microorganism feeds can be continuously or continually dispersed throughout the water body. A rapid and effective dispersion of the fluidized bacteria throughout the body of water allows for uniform augmentation and biomass growth throughout the tank, rather than having some areas, close to a solid feed container, having over stimulated growth and other areas, at some distance from the solid container, being essentially starved for microorganisms.

Suitable microorganisms useful herein include those that have the ability to do one or more of the following: convert ammonia to nitrite and nitrate; reduce biological oxygen demand; degrade fat, oil and/or grease contamination; degrade petroleum products and by-products, chemical contaminants such as insecticides, pesticides and dioxans, provide suppression or water detoxification, solids degradation; or any combination thereof. As specific examples, exemplary microorganisms include Nitritifiers (convert to Nitrite): *Nitrosomonas europaea, Nitrospira briensi, Nitrosococcus nitrosus, Nitrosococcus oceanus, Nitrosolobus multiformis*. Nitrafiers (convert to Nitrate) *Nitrobacter winogradsky, Nitrospina gracilis, Nitrococcus mobilis*. Those skilled in the art will be able to readily determine which microorganisms are suitable for their particular purpose.

The various microorganisms may either be mixed in liquid form in the concentrate feed containers, or individual microorganisms or mixtures of microorganisms may be combined in a single or in a plurality of bacteria culture concentrates canisters. Use of a plurality of bacterial containers may be advantageous where there are a variety of microorganisms that are intended to be used and where different microorganisms are to be injected into the system at different times, or in different concentrations, or at different locations. Similarly, it is useful where a much larger quantity of one or a few types of microorganisms are to be used as compared to others, since the ones that need to be replenished frequently can be isolated in their own canister which can be replaced, while the microorganisms, enzymes and/or nutrients which are used at a much slower rate can be kept in their respective cassettes.

In one embodiment of the present invention, the underwater unit is regulated by a controller 12 which is preferably a digital or analog processor, and includes one or more air and liquid distribution pumps that pulse bacteria at preprogrammed times and amounts and distributes air or oxygen continuously or continually to the underwater unit. In addition, the controller houses the bacteria in a canister concentrate along with the air distribution pump. One suitable bacterial pump is a 60 ml per hour cat #LO-3-10-120 Greylor micro pump from Greylor Company: Cape Coral, Fla. 33909 that is controlled by an Intermatic 24-hour, 7 Day, 30 Amp Full Year Water Sprinkler & Irrigation Timer. The controller can be timers that control the on and off cycles of the air and liquid distribution pumps, or any such device that controls the delivery of air and liquid. The instructions for the controllers are normally provided by the manufacturer.

Figure 4A:
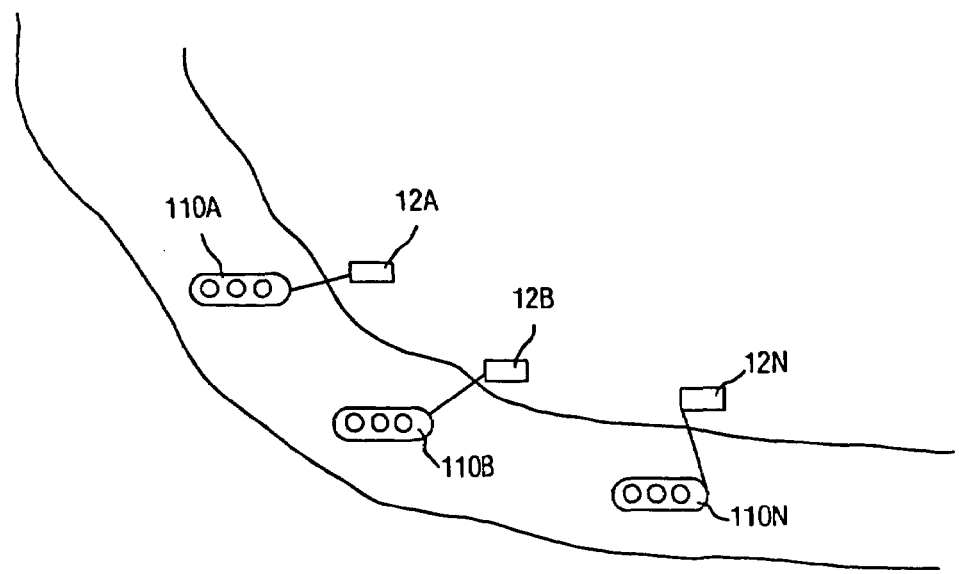
Figure 4B:
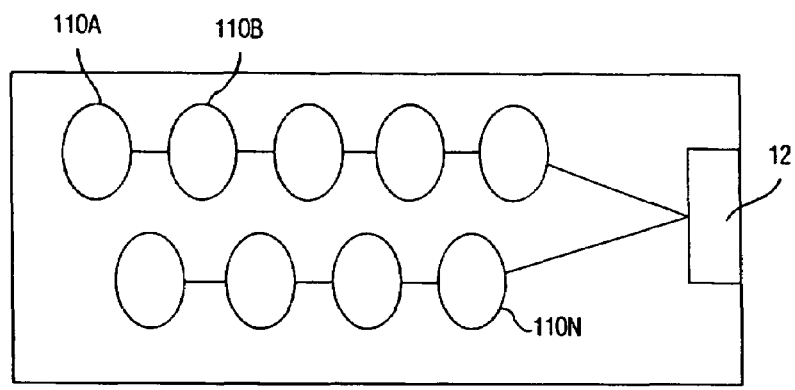

FIGS. 4A and 4B illustrate an alternative configuration wherein multiple underwater units 110A, 110B and 110N are strategically located in an aqueous body, such as a contaminated pond, river or stream. The units 110A, 110B, 110N can be controlled by a single controller 12 (FIG. 4B) where air or oxygen and bacteria are delivered to each system in an equal manner, or can be controlled by respective separate controllers 12A, 12B, 12N (FIG. 4A). These embodiments are an application of the point source distribution ability of the present invention, wherein the organisms and/or air or oxygen can be delivered directly to certain specific areas in the aqueous system being treated rather than the broad distribution throughout the system. Indeed, each respective unit can deliver different species in different amounts, or the same species in different amounts, depending upon the nature of the contamination in each respective area.

Figure 3:
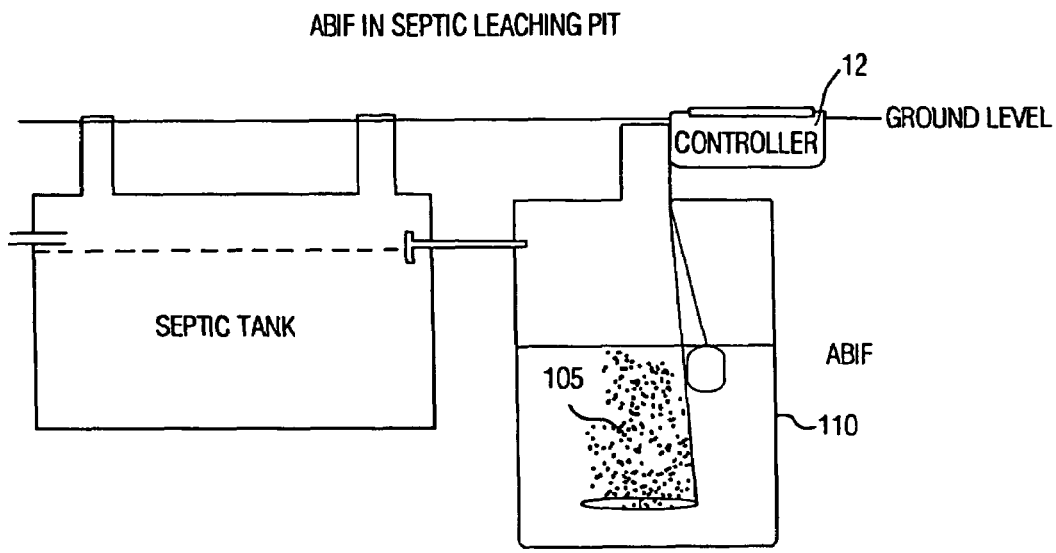

For small scale remediation of septic systems, grease traps and leaching fields, the microorganisms are tailored for the digestion of proteins, fats and oils, grease, sugars, starches, complex carbohydrates, detergents, phenols and cellulosic products in drainage water (FIG. 3). The vessel 110 is placed either in the septic tank or trap, and air (oxygen) as well as bacteria are delivered through the outlet T which leads directly to the part of the system requiring remediation. Certain of the bacteria take up residence on the matrix 105, and others are dispersed into the system using the bubble field lift created by the air or fluid flow. The system is easy to operate, provides reliable and consistent performance, exhibits operational stability with no loss of capacity over time, and is capable of withstanding the transient or impulse perturbation of carbon limitation. Reactor volume requirements are substantially less than those associated with conventional systems.

Figure 5:
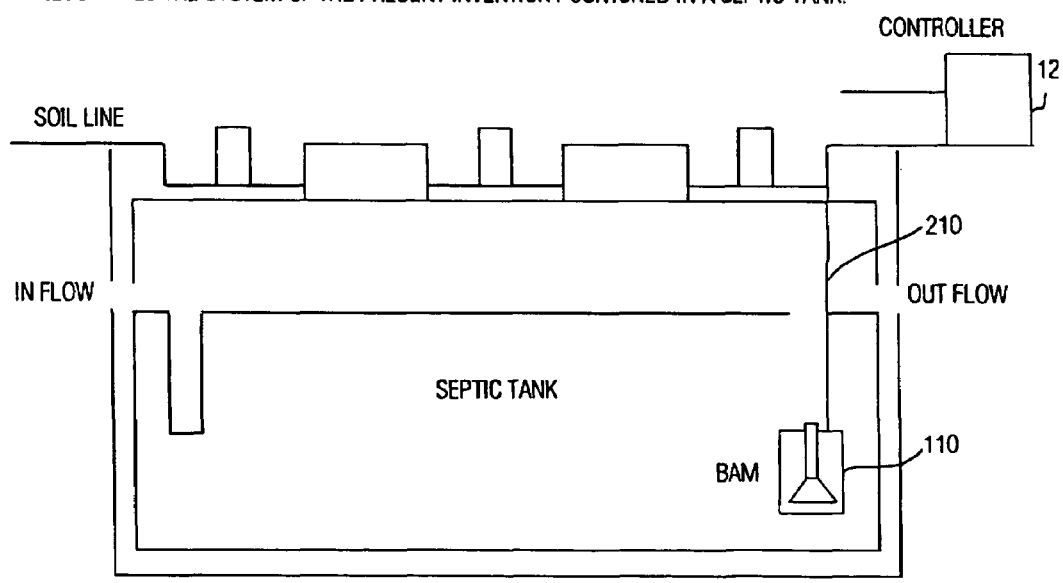

In an additional embodiment of the invention as illustrated in FIG. 5, the system of the present invention is placed at or near the outflow of a septic tank to a leaching field. Non-solid phase adherent bacteria suitable for digesting contaminants typical of the septic system involved, such as grease, fats and oils, are added to the vessel 110 and are injected at or near the "T" area outlet pipe 210. Air or oxygen is also injected as discussed above. The system thus provides suitable aeration and microbial injection into the "T" area outlet pipe 210, and can effectively unclog clogged leaching fields downstream of the "T".

In an additional embodiment of the invention as illustrated in FIGS. 4A and B, ABIF Systems are submerged on floating arrays tethered to the bottom and serviced from the shore. Air or oxygen is also injected as discussed above. This array thus provides a means to filter and augment stream, ponds and lakes from harmful pollutants such as petrochemicals and excess nitrogen.

Figure 6:
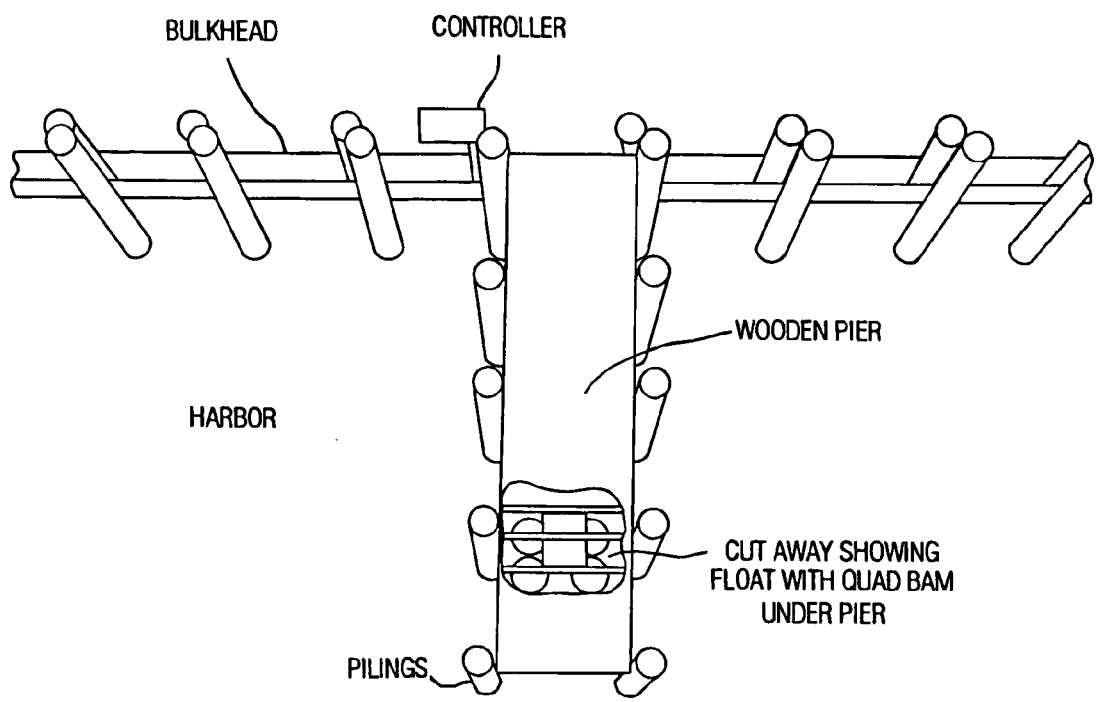

In an additional embodiment of the invention as illustrated in FIG. 6, the ABIF is configured on a submerged float secured beneath a pier. This provides a platform to augment and filter without causing problems for navigation.

Other applications of this process of water treatment are also contemplated, though not specifically identified. For example, it is understood that ponds and lakes and streams are amenable to decontamination by this process. Bacterial species delivered directly to the water body (.e.g., species that are not solid phase adherent) may be implemented. Similarly, the water to be treated by the disclosed device and process may be located anywhere and used to grow virtually anything.

The maintenance of the microorganisms in the controller canister also may be aided by air or mechanical mixing of the aqueous biomass in the canister or cassette. Many such microorganisms, nutrients and enzymes are commercially sold as proprietary products. Those skilled in the art are able to determine the materials appropriate for their needs by selecting those which provide the desired bacterial seed treating functions, such as growth enhancement, stress reduction, enhancing disease-resistance and/or pest-resistance.

Numerous microbial nutrients and enzymes are also known, such as those exemplified by a products commercially available from companies such as United-Tech of Tulsa, Okla.; Microtack Organic, Bangkok, Thailand; MTC Distributors, Auburn, Calif.; Global Environmental Services, Inc., Fineville N.J. The above are only examples of the various sources that may provide bacteria and nutrients and are in no way intended to limit the scope of the invention.

It will be evident that there are numerous embodiments of this invention that, while not expressly described above, are clearly within the scope and spirit of the invention. The above description is therefore intended to be exemplary only, and the scope of the invention is to be limited solely by the appended claims.

EXAMPLES

Example 1

Bacteria mixtures useful in nitrification were prepared by mixing bacterial mixtures containing various bacterial strains known to nitrify. For nitrification, a mixture of *Enterobacter Sakazaki* (ATCC 29544), *Bacillus coagulans* (ATCC 7050), *Bacillus subtillis* (ATCC 6051), *Bacillus subtillis* (ATCC 6051), *Bacillus megatarium* (ATCC 7052), *Bacillus licheniformis* (ATCC 14580), *Bacillus cerus* (ATCC 4513) and *Bacillus pasytereurii* (ATCC 11859) was used. For nitrification in different environmental conditions the absolute species of bacteria were not easy to identify, and include *Nitrobacter* and *Nitrococcus* spp. obtained from Cape Cod Biochemicals, 21 Commerce Road, Bourne, Mass.

Bacterial growth media was prepared in 1 liter batches by dissolving 20 g Bacto Tryptose, 2 g Bacto Dextrose, (Difco Laboratories, Detroit, Mich.), 5 g sodium chloride, and 2.5 g disodium phosphate (Sigma-Aldrich Corp., St. Louis, Mo., USA) in 1 liter of deionized water, and sterilizing at 250° F. for 15 minutes in an autoclave. The bacteria, 0.1 ml, if in liquid form, and 0.5 g, if in dry form, were added to 100 ml of media prepared above, and grown at 37° C. for 3 days. At the end of 3 days, 100 ml of the grown bacteria were added to 4 liters of growth media, and grown for 3 days before use. The bacterial mixtures were then transferred to the cassette and then used in field testing.

Example 2

The ABIF and the bacteria as shown in example 1 were tested in a field test. A failed leaching pit was treated. The system consisted of a 2000-gallon septic tank attached to a leaching pit where the fluid level was initially 28 cm over the inflow pipe from the septic tank to the house. The samples of the sewage water depth in the leaching pit were taken near monthly over a 3-month period using a measurement from the top edge of the riser to the septage fluid height. Over the 90-day period the fluid level drop over 1 meter. The fluid level has remained below the input pipe for 10 months. See FIG. 7.

Example 3

Figure 2:
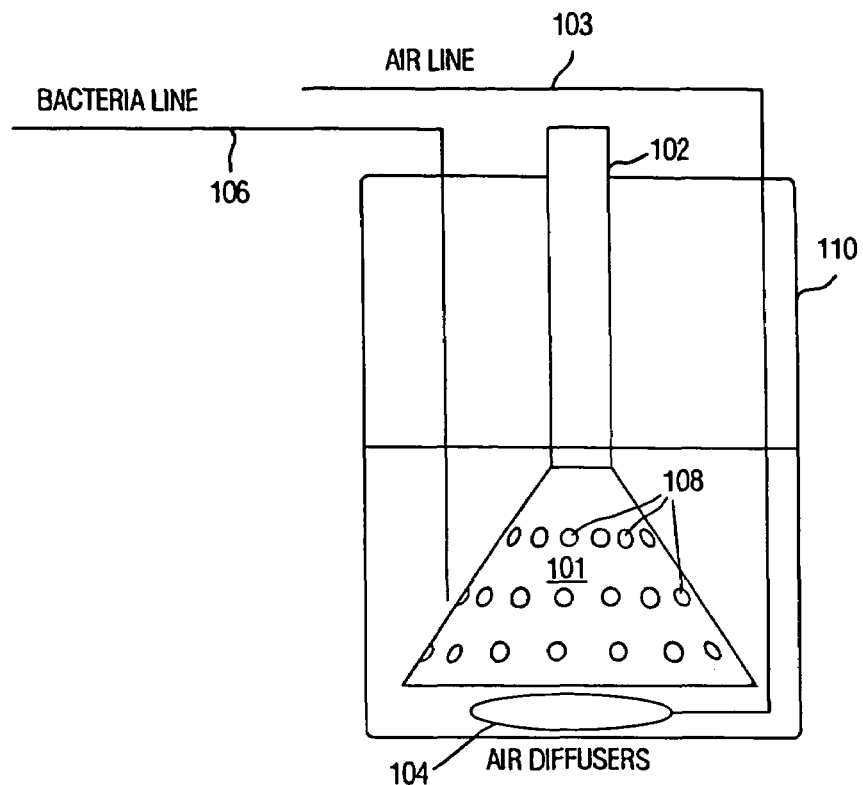
Figure 2A:
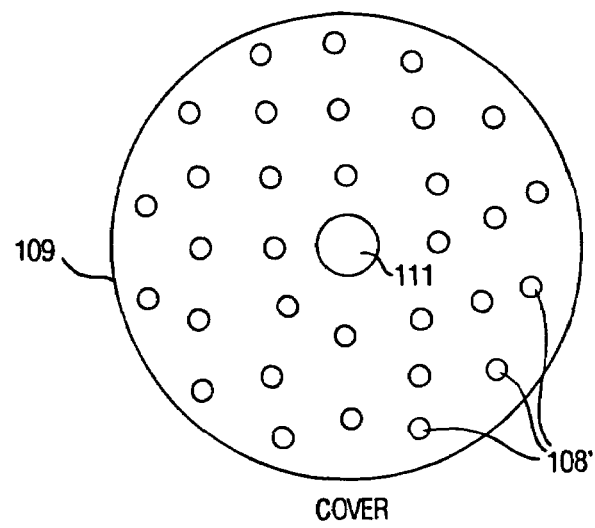

The bacterial mixtures were then tested in a field test in a system as described in FIG. 2 and FIG. 3, in a sewage treatment testing facility. The wastewater exiting the settling tank had 36 ppm ammonia, and was flowing at a rate of 78 gallons/day. The nitrogen was all in the form of ammonia at 1 and 2 feet below the leaching field. The septic/settling tank had a capacity of 1500 gallons and the system had been running for 3 months prior to the onset of trials. The bacteria mixture of nitrifiers was fed at a rate of 11 ml/hr for 1 hour, 4 times/day. Samples were taken weekly from sample ports under the leaching field at a depth of 1, and 2 ft and tested for ammonia and nitrate nitrogen. The results indicated that within 14 days there was a complete conversion of ammonia to nitrate one foot below the drainage piping. Ammonia was measured using a Hanna Instruments Inc., 584 Park East Drive, Woonsocket, R.I. 02895, High Range Ammonia Calorimeter, Catalog No, HI 93733, and the ammonia testing reagents kits. Nitrate was measured using a Hanna Instruments Inc, 584 Park East Drive, Woonsocket, R.I. 02895, Nitrate Calorimeter, Catalog No, HI93728, and the nitrate testing reagents kit.

Example 4

Figure 10:
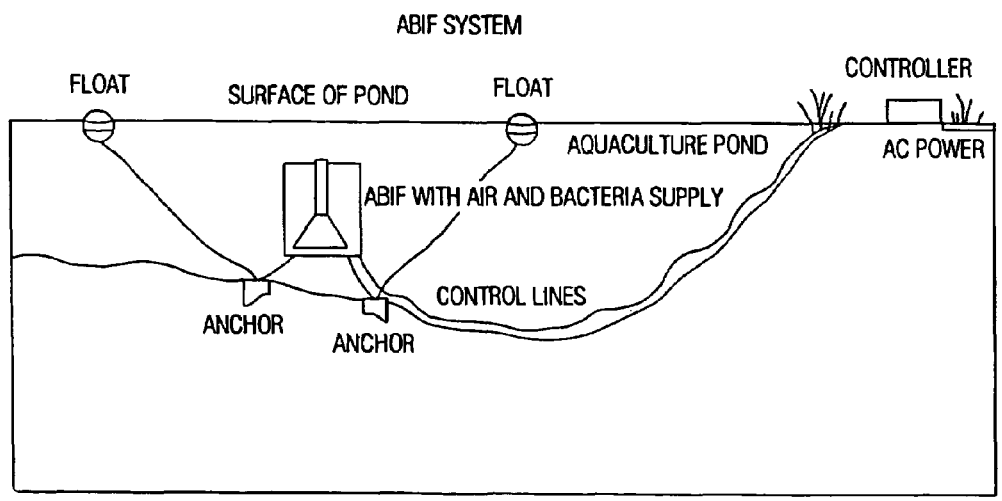
Figure 11:
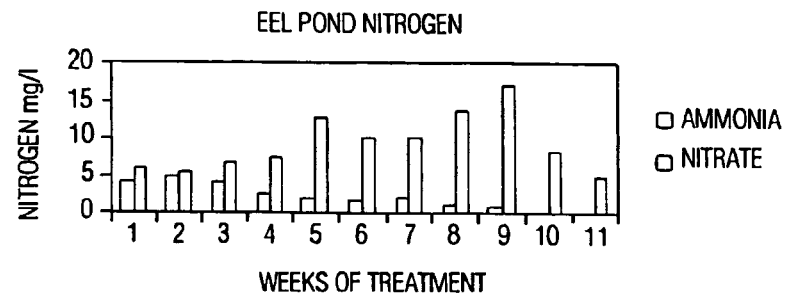

The ABIF system with nitrification bacteria was tested in a aquaculture field test. Larger scale round ABIF units were tested in a 2 hectar pond containing eels in mid phase grow out. Before the experiment began ammonia levels had begun to climb. The settings on the ABIF were between 300–500 ml per day of a nitrifier mix as shown in Example 1. The air injector was set at 350 L/min and ran continuously. The ABIF system dimensions were 3M in diameter and 1.60 M tall See FIG. 10. Samples were averaged from 3 locations and taken weekly for ammonia and nitrate. These data (FIG. 11) show a gradual conversion of ammonia into nitrate that is detectable after 4 weeks of treatment.

Example 5

A 2000-gallon septic tank that was attached to a summer seasonal home was treated with bacterial strains that produce the enzymes cellulase and amylase. Before treatment with the bacterial mixture the tank had sludge to a height of approximately 26 inches. The sludge in the tank following treatment measured at the end of about 6 months was less than 2 inches in depth.

Example 6

The ABIF was installed in the septic tank described in Example 5, which is approximately 8 feet by 6 feet by 6 feet. A second control septic tank system also received the same flow rate and timing but had no ABIF. Oxygen measurements were made in the septic tank, in the T connection on the effluent side and down stream in the distribution box. Air and bacteria were added daily. The results show oxygen values in the control tank were below detection at all positions and in the ABIF treated tank, oxygen values in the tank outside the T were below detection as well, in the effluent T was 0.5 mg/L and in the effluent distribution box was 4.3 mg/L. These data show that the addition of aeration to the T connector is sufficient to produce an oxygen containing effluent without oxygenating and disturbing the entire septic tank.

Example 7

The ABIF having FOG (Fats Oils and Grease) reduction bacterial species was installed inside a 2000-gallon grease trap servicing a seasonal restaurant. The grease trap system had not been pumped or treated for over 4 years and the grease was solid to almost the bottom of the tank. Repeated attempts at chopping the grease and flowing the liquid had failed. The ABIF was run throughout for 3 months with the grease interceptor system receiving no flow. The system was inspected and pumped after treatment. The complete 2000 gallons was pumped. It appeared to be a cream consistency with a thin layer of "corn like" grease on the top.

Example 8

Figure 12:
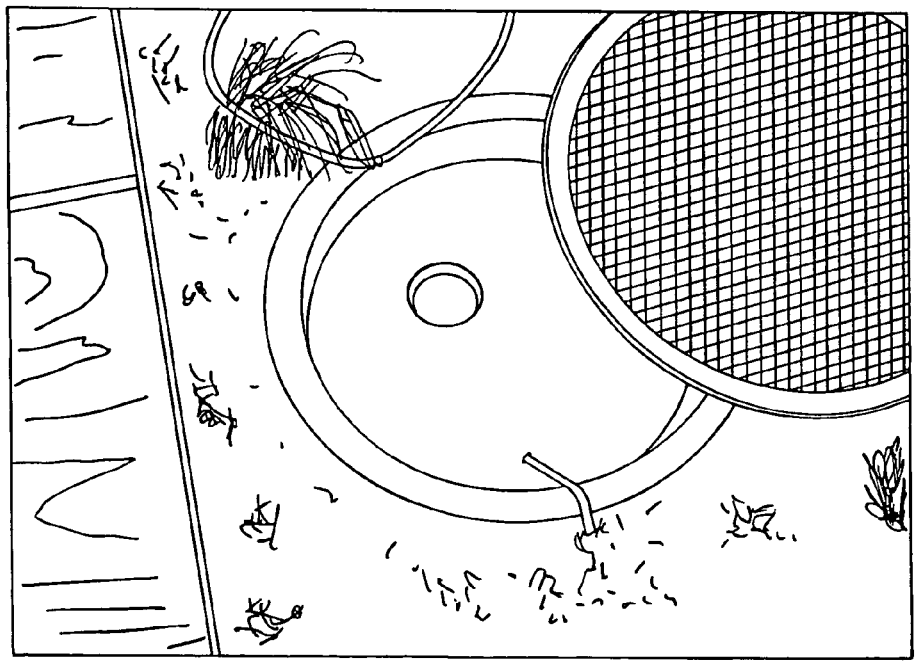
Figure 13:
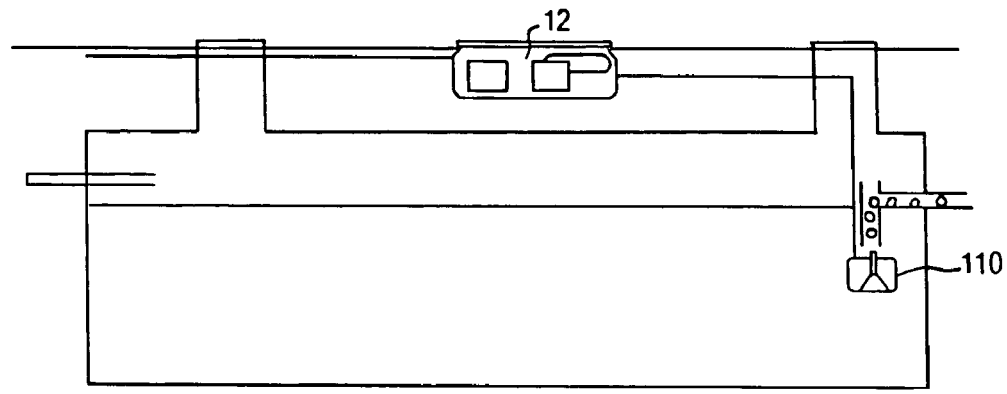

An ABIF was installed at a Sewage Treatment Testing Facility in a septic tank having multiple flow rates. The 5-gallon ABIF prototype unit is designed and placed as shown in FIG. 12 in a 2000 gallons septic and suspended below the effluent T. See also FIG. 13. The purpose of this experiment is to evaluate the impact of a Prototype ABIF unit on sludge depth, odor, oxygen levels inside and outside of the Effluent T and determine the long term effects of being left in the system out of service. Samples were taken weekly for 16 weeks. Two identical systems C1 and C2 were used as controls. Only C3 received the ABIF unit and had air and bacteria delivered. Because all systems were fully functional, no Type V failure was addressable. This trial was to examine the effects on a system prior to failure.

Briefly, each tank cover was removed, an oxygen probe was calibrated in air and inserted either in the T or several feet away (ExTech Instruments Inc). Sludge depth was taken with a standard "Sludge Judge" (Forestry Supplies Inc.) The flow rates into the septic tank were increased each month from 150 GPD initially to 550 GPD in the final month. Other parameters were noted such as surface flotsam and odor. The data shown in Table 1 show no significant increase in sludge depth during the test period. Oxygen levels in the T are elevated relative to the outside of the ABIF air delivery.

TABLE 1

Showing Data from C3.

| Sample week | Sludge Depth Inches | Oxygen IN T mg/l | Oxygen Outside T mg/l |
|---|---|---|---|
| 1 | 4 | 1.5 | 0 |
| 2 | 4 | 1.6 | 0 |
| 3 | 3 | 1.8 | 0 |
| 4 | 5 | 1.3 | ND |
| 5 | 4 | 1.5 | 0 |
| 6 | 3 | 1.9 | 0 |
| 7 | 3 | 0.8 | 0 |
| 8 | 4 | ND | ND |
| 9 | 3 | 0.8 | 0 |
| 10 | 3 | ND | 0 |
| 11 | 3 | 1.1 | 0 |
| 12 | 2 | 0.9 | 0 |
| 13 | 3 | 1.9 | 0.2 |
| 14 | 2 | ND | ND |
| 15 | 4 | 1.6 | 0.1 |
| 16 | 2 | 0.7 | 0 |

ND = No Data

Example 9

Failing Leaching Pit

A second experiment was conducted on a failed leaching pit where the homeowner, a Cape Cod resident, alternates between 2 leaching pits on a yearly cycle. The house is 75 years old and the leaching pits have a volume estimated as 300 and 700 gallons respectively. The 300 gallon system, the oldest, had been showing signs of wetness, odor and flooding above the inflow pipe. Typically the flow is channeled to the alternate leaching pit when this occurs. Air and bacteria treatment were begun with the goal of reducing the water level in the failed pit. Visual measurements along with water depth were taken every 2–6 weeks for nearly 8 months. The system was restarted and received standard household flows for a young family of 4.

The cement cover was replaced with a plywood cover because of weight concerns. The height of fluid was measured from the soil surface. Odors were measured at the sampling time and the owners were questioned concerning the interim periods.

TABLE 2

Leaching Pit Observational Data

| Observation Number | Fluid Depth inches | Odor | Comments |
|---|---|---|---|
| 1 Time Zero | 17 | moderate | Over inflow pipe, odor and walls scum |
| 2 | 19 | None | Over inflow, no odor, less scum |
| 3 | 24 | None | At inflow, no odor, low scum, air rest to 60 L/Hr |
| 4 | 39 | None | Below inflow |
| 5 | 56 | None | Only a few inches to bottom. Diffuser partially out fluid. |
| 6 | 30 | None | System Restart. Flow for 1 week |
| 7 | 22 | None | System running 8 weeks. |

Note system has been running 9 months and about to be switched to larger tank. No wetness or overflow has occurred since last sample.

Example 10

Impacted Home Leaching Pit

Figure 14:
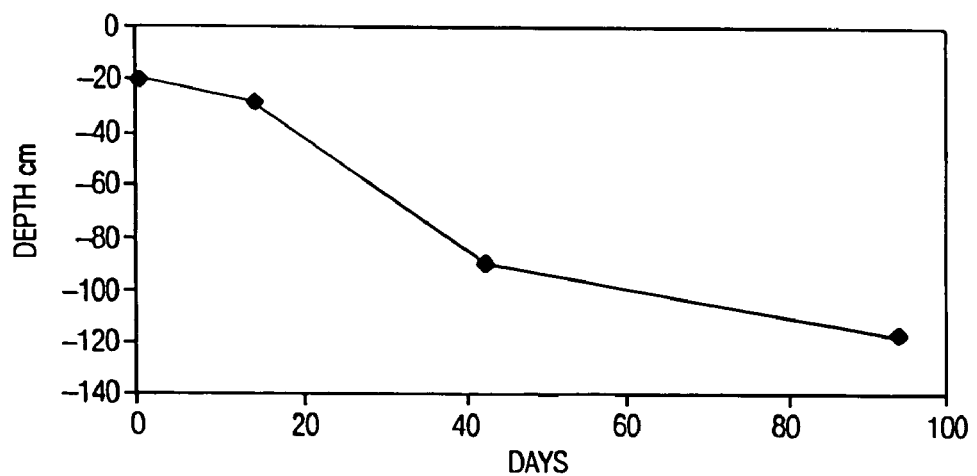

A single installation of a ABIF aerobic unit was made in a leaching pit of a 1968 Code Title V system. The system had fluid levels above the in flow pipe and obvious grass wetting and an odor was evident. Over a period of 90 days the effluent level in the pit dropped 117 CM. The wetness was eliminated and the odors are no longer present. The system was turned off and the pit has been in continuous use with no problems for over 2 years. The effluent level is shown graphically in FIG. 14.

Example 11

RUCK® Filter Rejuvenation

An assisted living facility has a RUCK® CFT installation having two RUCK filters. The RUCK System operates under a groundwater discharge permit. A field investigation found a vent line was flooded, resulting in a lack of air exchange and a degraded RUCK filter. The flooding was removed and the venting changed to eliminate future flooding potential in the vent line.

The time to dose the second RUCK filter was approximately five times the time to close the first RUCK filter. In mid winter the flooding problem was solved. An inject sequence of bacteria used in ABIF technology was added to the pump station dosing the RUCK filter. A source of air and a diffuser were added to the pump station.

The bacterial augmentation was continuously dosed. The results show significant improvement over time. The run times dropped from 81.4 hours during a period with average flows of 7825 GPD (Gallons Per Day) to pump run times of 42.4 hours approximately three months later where the average flow was 9285 GPD. The run times for that pump dropped to 36.3 hours.

Figure 15:
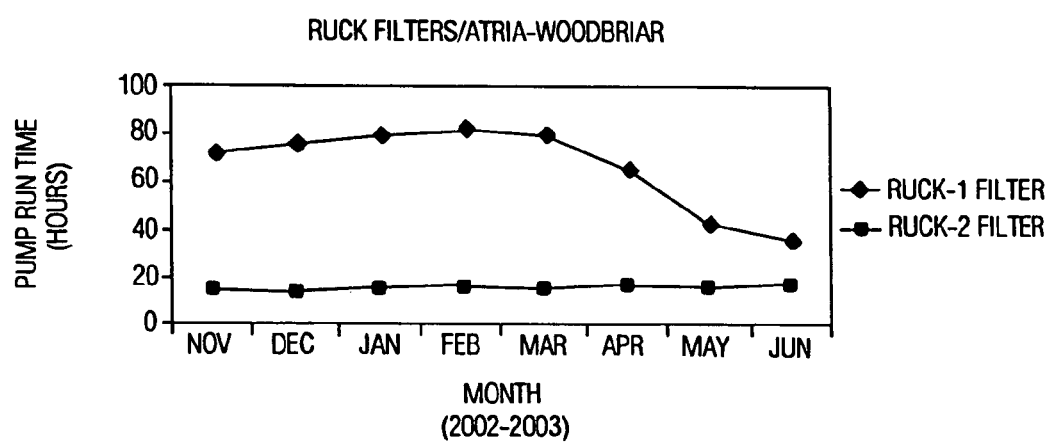

The second filter pump is further from the pump station than the first filter pump. The multiplier of the run times has dropped from a high of 5.6 times to 2.1 times. Daily readings the next month show that the multiplier is at 1.8. The graph in FIG. 15 shows the reduction in pump times.

Example 12

ABIF Aquarium Study

Figure 8:
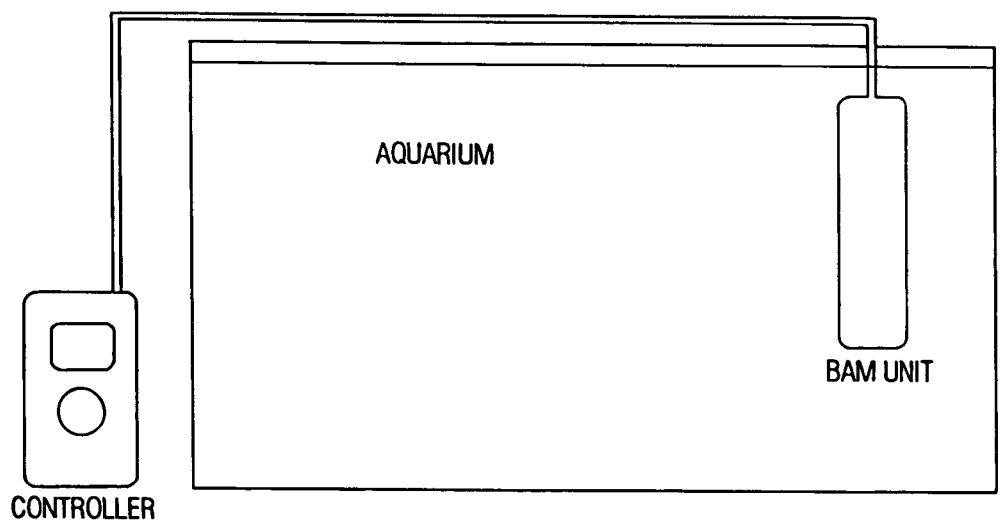
Figure 9:
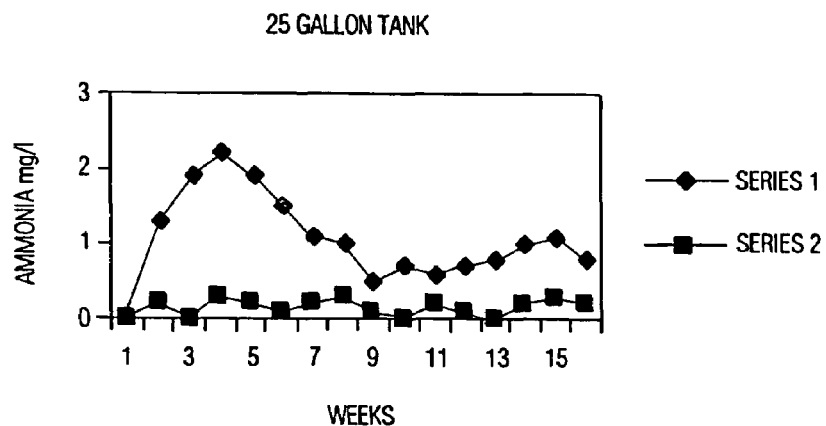

Two sets of 25-gallon aquaria were filled with identical quantities of filtered tap water and allowed to degas for 3 days. One system had a ABIF installed and the second unit was aerated only. The ABIF injected 10 ml of nitrifiers a day using a 501 U Watson Marlow peristaltic pump and digital 7 day Intermatic timer (FIG. 8). Air was supplied with a Jena 140 L per hour aquarium pump to both tanks in equal amounts. Twenty adult guppies (*Poecelia reticulata*) were placed in each tank. The ABIF was turned on 3 days before the fish were introduced. The fish were fed daily with Tetramin fish flakes. The tanks were not cleaned. Fish were removed as they died. The ammonia data showed a pronounced increase in the tank with out ABIF (see FIG. 9). Over the 4 months of experimentation the ammonia level stayed flat in the ABIF tank and 3 fish died. In the non-ABIF tank 12 fish died (Data not shown).

What is claimed is:

1. Apparatus for the treatment of contaminated water, comprising a vessel, a filter matrix in said vessel, a source of oxygen or air in communication with said vessel, a source of bacteria in communication with said vessel, a controller for controlling the amount and timing of the introduction of bacteria from said bacteria source to said vessel, and an outlet for dispensing at least a portion of said bacteria out of said vessel and into said contaminated water, wherein said vessel further comprises an accelerator comprising a perforated cone having an inlet end and an opposite end terminating in a chimney, said chimney being in fluid communication with said contaminated water.

2. The apparatus of claim 1, further comprising an oxygen or air diffuser in fluid communication with said oxygen or air source, for providing oxygen or air to said inlet end of said cone.

3. Apparatus for the treatment of contaminated water, comprising a vessel, a filter matrix in said vessel, a source of oxygen or air in communication with said vessel, a source of bacteria in communication with said vessel, a controller for controlling the amount and timing of the introduction of bacteria from said bacteria source to said vessel, and an outlet for dispensing at least a portion of said bacteria out of said vessel and into said contaminated water, wherein said filter matrix comprises a plurality of membranes, each of said plurality specific to supporting a predetermined species of bacteria.

4. The apparatus of claim 1, wherein said filter matrix comprises rock wool, synthetic and natural fibrous or porous materials.

5. The apparatus of claim 1, wherein said bacteria are provided to said filter matrix in a form selected from the group consisting of a liquid medium and an aqueous suspension.

6. The apparatus of claim 1, wherein said contaminated water is water from an aquaculture pond associated with a bay, a stream or a lake.

7. A septic tank comprising an inlet for the introduction of waste, an outlet in communication with a leaching field, and apparatus for degrading said waste, said apparatus comprising a vessel submerged in said tank, a filter matrix in said vessel, a source of oxygen or air in communication with said vessel, a source of bacteria in communication with said vessel, and a controller for controlling the amount and timing of the introduction of bacteria from said bacteria source to said vessel.

8. The septic tank of claim 7, wherein said tank as a T-outlet, and wherein said vessel is positioned in said tank at said or near the T-outlet of the septic tank.

9. The apparatus of claim 1, wherein said vessel further comprises nutrients for said bacteria.

10. The Apparatus according to claim 1, wherein said filter matrix comprises a first layer of clay, a second layer of spun rock, and a third layer of plastic fiber.

11. The apparatus of claim 1, wherein said bacteria comprise solid phase adherence bacteria, and wherein said filter matrix is a solid support for entrapping said solid phase adherent bacteria.

12. The apparatus of claim 1, wherein said bacteria comprise non-adherent bacteria, and wherein said apparatus is adapted to disperse said non-adherent bacteria from said vessel and into said contaminated water without said non-adherent bacteria adhering to said filter matrix.

13. The septic tank of claim 7, wherein said filter matrix comprises a first layer of clay, a second layer of spun rock, and a third layer of plastic fiber.

14. The septic tank of claim 7, wherein said bacteria comprise solid phase adherence bacteria, and wherein said filter matrix is a solid support for entrapping said solid phase adherent bacteria.

15. The septic tank of claim 7, wherein said bacteria comprise non-adherent bacteria, and wherein said apparatus is adapted to disperse said non-adherent bacteria from said vessel and into said septic tank without said non-adherent bacteria adhering to said filter matrix.

16. The septic tank of claim 7, wherein said filter matrix comprises rock wool, synthetic and natural fibrous or porous materials.

17. The septic tank of claim 7, wherein said bacteria are provided to said filter matrix in a form selected from the group consisting of a liquid medium and an aqueous suspension.

* * * * *